United States Patent [19]

Hegedus et al.

[11] Patent Number: 5,043,373

[45] Date of Patent: * Aug. 27, 1991

[54] HIGH GLOSS CORROSION-RESISTANT COATINGS

[75] Inventors: Charles R. Hegedus, Warrington, Pa.; Donald J. Hirst, Mt. Laurel, N.J.; Anthony T. Eng, Philadelphia, Pa.; William J. Green, Clementon, N.J.

[73] Assignee: The United States of America as represented by the Secretary of the Navy, Washington, D.C.

[*] Notice: The portion of the term of this patent subsequent to Dec. 5, 2006 has been disclaimed.

[21] Appl. No.: 442,085

[22] Filed: Nov. 28, 1989

Related U.S. Application Data

[63] Continuation-in-part of Ser. No. 331,200, Mar. 28, 1989, Pat. No. 4,885,324, which is a continuation of Ser. No. 211,026, Jun. 16, 1988, abandoned.

[51] Int. Cl.$^5$ .............................................. C08L 75/04
[52] U.S. Cl. .................................... 524/204; 524/396; 524/406; 524/414; 524/706; 524/724; 524/783
[58] Field of Search ............... 524/204, 396, 406, 414, 524/706, 724, 783

[56] References Cited

U.S. PATENT DOCUMENTS

| | | | |
|---|---|---|---|
| 3,523,100 | 8/1970 | Stein et al. | 260/47 |
| 3,554,951 | 1/1971 | Blomeyer et al. | 524/873 |
| 4,075,152 | 2/1978 | Taller | 524/873 |
| 4,515,919 | 5/1985 | Bradley et al. | 524/591 |

Primary Examiner—Maurice J. Welsh
Attorney, Agent, or Firm—James V. Tura; James B. Bechtel; Susan E. Verona

[57] ABSTRACT

A high-gloss, corrosion-resistant coating which can be applied directly to a surface comprising about 30 to 82 percent by weight of a polymeric binder and 18 to 70 percent by weight of a pigment system consisting essentially of zinc molybdate, zinc salt of benzoic acids, and zinc phosphate in specific ratio's. The coating exhibits good adhesion, flexibility, chemical- and weather-resistance.

15 Claims, No Drawings

HIGH GLOSS CORROSION-RESISTANT COATINGS

STATEMENT OF GOVERNMENT INTEREST

The invention described herein may be manufactured and used by or for the Government of the United States of America for governmental purposes without the payment of any royalties thereon or therefor.

CONTINUATION APPLICATIONS

This application is a continuation-in-part of copending application Ser. No. 07/331,200 filed Mar. 28 1989 now U.S. Pat. No. 4,885,324 which in turn is a continuation of copending application Ser. No. 07/211,026 filed June 16, 1988, now abandoned.

BACKGROUND OF THE INVENTION

This invention relates to novel coating compositions and more specifically to corrosion resisting coatings which can be applied directly on to various surfaces particularly metal and polymeric composite substrates as a single topcoat.

Various surfaces and particularly metal substrates require the protection of a coating especially when the surfaces are exposed to a corrosive environment. Metal surfaces on aircraft for example are exposed to seawater spray which require protection from corrosion due to salt, etc. Specifically, aircraft, i.e., Navy aircraft, which are exposed to aircraft carrier environment are subjected to seawater spray in addition to various acid forming gases such as sulfur dioxide and carbon dioxide. Moreover, in addition to aircraft, various machinery and equipment in the industrial environments where fossil fuels are used need protection against corrosion. In addition to corrosion, it is important that the coatings be resistant to various chemicals, the weather, be flexible and have good adhesion.

Presently, coating systems comprise one or more films, i.e., an undercoat and a topcoat. Aircraft have been traditionally coated with high performance two-component protective coatings generally consisting of an epoxy primer and a polyurethane topcoat. The epoxy primers used on the aircraft are designed to adhere to the metal surface and improve the adhesion of the topcoat and prevent corrosion. However, the primer coat requires a topcoat, since it lacks flexibility especially at low temperatures (−60° F.) which results in extensive cracking in highly flexed areas of the aircraft. The primer also lacks weather resistance and cannot generally be formulated in various colors required for aircraft. Thus, the polyurethane compositions of this invention provides not only resistance to the weather and various chemicals, i.e., NaCl, $SO_2$ and $CO_2$, but also have the required degree of flexibility and the desired optical properties. Moreover, the multi-film coating systems utilized heretofore generally have a total dry film thickness ranging up to about 0.005 inches, e.g., up to about 5 mils or more which adds considerable weight to the aircraft. Further, it is very time consuming to apply two coats particularly since there is a drying time requirement between each application. The removal of a two-coat system also can be difficult and time consuming and the prior coatings generate high levels of volatile organic component (VOC) emissions during the coating operations.

In accordance with this invention, however, the corrosion resistant coating comprises a polyurethane binder derived from the reaction of at least one polyester polyol and a diisocyanate in combination with a unique pigment system consisting essentially of an alkaline earth phosphate particularly zinc phosphate or a zinc-barium phosphate, a zinc salt of benzoic acid or substituted benzoic acids, and zinc molybdate. All three of the zinc salts are critical in the relative proportions to provide a high gloss film with the necessary corrosion resistance required of a coating for aircraft. Other pigments and particularly titanium dioxide ($TiO_2$) including the spherical $TiO_2$ particles and the vesiculated beads e.g. beads containing $TiO_2$ may be included as a pigment together with the three zinc salts disclosed herein. The coating composition of this invention may be applied as one coat directly to various hard surfaces such as metal, wood, composites and does not require a topcoat to provide a high-gloss, corrosion-resistant finish.

It is generally known that low gloss coatings are appropriate for camouflage purposes particularly on most of the outer exposed surfaces of military aircraft, but low gloss coatings are not appropriate for the internal or unexposed surfaces such as the engine inlet, ducts, landing gear, etc. Nonmilitary aircraft, particularly require high gloss, high visibility coatings. Thus, it was heretofore believed that in order to obtain good corrosion resistance the pigment volume concentration (PVC) had to be relatively high thereby also resulting in a low gloss finish. It was therefore believed that it was not possible to obtain a coating which had a high gloss and at the same time good corrosion resistance.

SUMMARY OF THE INVENTION

Accordingly, it is the object of this invention to provide a high-gloss corrosion resistant coating which can be applied directly to a surface e.g., metal, as a single one coat.

It is another object of this invention to provide a coating which is flexible, resistant to chemicals, resistant to weathering, and exhibits good adhesion.

It is still another object of this invention to provide a corrosion-resistant coating composition capable of reducing the time, manpower and materials required for applying onto a substrate.

It is still a further object of this invention to provide a coating for military or civilian aircraft of substantially reduced thickness and which thereby reduces the weight added to the aircraft while at the same time providing the necessary corrosion resistance.

These and other objects of the invention are accomplished in accordance with this invention by providing a corrosion-resistant composition capable of being applied as a single topcoat exhibiting high gloss and corrosion resistance.

THE PREFERRED EMBODIMENT

This invention is directed to a high-gloss, corrosion resistant coating which functions as a primer or as a single topcoat which has good adhesion characteristics, highly flexible and resistant to chemical and weather conditions.

More specifically, this invention relates to a high gloss, corrosion-resistant coating composition which comprises from about (a) 30 to 82 percent by weight of the coating of an organic polymeric binder i.e., a polyurethane binder, and (b) about 18 to 70 percent by weight of the coating of a pigment system consisting essentially of a critical ratio of about 13 to 34 parts by weight of a zinc phosphate e.g. zinc-barium phosphate, 1 to 5 parts by weight of a zinc salt of a benzoic acid or a substituted benzoic acid, and about 63 to 85 parts by weight of zinc molybdate. In addition, depending on the opacity etc. required of the coating, from 0 to 85 percent by weight of titanium dioxide based on the total weight of the pigment system, i.e. combination of three zinc salts may be added to the coating as an additional pigment. The coating is applied, preferably as a solution comprising about 0 to 85 e.g. 20 to 50 percent by weight of the total coating of at least one organic solvent including various mixtures of hydrocarbon solvents or known paint solvents.

In the preferred embodiment, the organic binder comprises a polyurethane, and more particuary an aliphatic polyurethane derived from the reaction of a saturated polyester polyol and a multi-functional aliphatic polyisocyante based on hexamethylene diisocyanate (HDI). The polyester polyol is preferably used in solution with an organic solvent e.g. toluene, xylene, n-butyl acetate, etc., and the HDI is preferably used in solution with other organic solvents such as n-butyl acetate, xylene, etc. The hydroxyl number of the polyester polyol and the isocyanate (NCO) content and the equivalent weight of the isocyanate should be controlled to obtain the desired urethane film. Thus, the preferred polyols and isocyanates are reacted in approximately stoichiometric amounts such that the NCO to OH ratio ranges from about 0.85-1.2 equivalents of the NCO to 1.0 equivalent of the OH e.g. 1 to 1 ratio.

The pigment system of this invention is unique and consists essentially of a zinc phosphate e.g. zinc-barium phosphate, zinc salts of benzoic acid or a substituted benzoic acid and zinc molybdate in controlled ratios. These three pigments alone or in combination with other pigments e.g. $TiO_2$ provide outstanding corrosion protection, which enables the coating to be used as a primer or topcoat. It is important to recognize that the preferred zinc salt of the benzoic acids are characterized as preferably having at least one hydroxyl substituent and at least one ($NO_2$) group. The zinc salts of the benzoic acids are further characterized as having molecular weights of approximately 100 to 500 and a density of about 2-3 grams per milliliter. The zinc phosphates e.g. zinc-barium phosphate are available as Phos-Plus (J0866) from Mineral Pigments Corporation. The zinc molybdates are well known zinc compounds commerically available as Moly-White. In addition to utilizing the pigment system in the required ratios i.e. parts by weight, other known pigments particularly titanium dioxide may be added to the coating not only to provide reinforcing strength but also to add color, hiding and opacity to the coating. Other additives include tinting or coloring agents which may be added to the coating in small but effective amounts and include such compounds as zinc oxide, antimony oxides, barium sulfate, calcium carbonates and one or more of the organic pigments such as the phthalocyanine colors e.g. greens or blues, etc.

Specifically, high gloss corrosion resistant coatings of this invention were prepared by glass shot-milling the ingredients set forth in the Examples.

| INGREDIENTS | EXAMPLES Percent by weight | | | |
|---|---|---|---|---|
| | I | II | III | IV |
| Polyester polyol | 18.4 | 17.6 | 15.8 | 10 to 30 |
| Hexamethylene diisocyanate (HDI) | 11.7 | 11.2 | 10.0 | 5 to 20 |
| Zinc-barium phosphate | 2.7 | 10.1 | 13.6 | 2 to 15 |
| Zinc salt of a (OH) and ($NO_2$) substituted benzoic acid | 0.2 | 1.0 | 1.4 | 0.1 to 2.0 |
| Zinc molybdate | 5.3 | 18.9 | 25.5 | 2 to 30 |
| Titanium dioxide | 25.5 | 7.6 | 3.4 | 0 to 85 |
| Solvent | 38.5 | 33.6 | 30.3 | 5 to 80 |
| Pigment Volume Conc. | 24.0 | 23.5 | 28.0 | 5–40 |
| NCO-to-OH ratio | 1:1 | 1:1 | 1:1 | 0.85–1.2 to 1.0 |

| INGREDIENTS | EXAMPLES Percent by weight | | |
|---|---|---|---|
| | IV | V | VI |
| 1. 37% solution of polyester polyol in toluene. | 49.74 | 67.63 | 42.56 |
| 2. Titanium dioxide ($TiO_2$) | 23.0 | 0 | 2.74 |
| 3. Zinc phosphate | 2.65 | 3.60 | 13.82 |
| 4. Zinc salt of a substituted benzoic acid (Sicorin RZ) | 0.26 | 0.36 | 1.50 |
| 5. Zinc Molybdate | 5.29 | 21.22 | 26.02 |
| 6. 75% solution of HDI in toluene and acetate. | 15.60 | 21.22 | 13.36 |

Note:
Sicorin RZ is a commercial product identified as a hydroxy and $NO_2$ substituted benzoic acid salt.

Preferably, the coatings are prepared by mixing all of the ingredients, except the HDI and milling the mixture to a fineness of grind of about 7 on the Hegman scale according to ASTM D1210. Subsequently, the solution of HDI is added shortly before application of the composition which is applied to thickness ranging from about 0.001 to 0.003 inches e.g. up to about 10 mils preferably 1 to 3 mils. The coating may be applied by various methods including spraying, rolling, or brushing onto the surface. The viscosity of the coating for any particular application may be achieved by adjusting the content of the solvent within the ranges specified herein. After the coating composition is applied to the surface, the solvent is evaporated at room or elevated temperatures and the film cures to a coating having the desired film properties.

The pigments can be introduced into the coating composition by first forming a mill base with the polyester polyol. The mill base can be formed, for example, by conventional sand-grinding or ball-milling techniques, and then can be blended, by simple stirring or agitation, with the other constituents of the coating composition.

It was unexpected to discover that the combination of zinc molybdate, a zinc salt of benzoic acid e.g. zinc benzoate and zinc phosphates synergistically function to improve the corrosion resistance of the coating when formulating high gloss paints. In other words, the specific combination of zinc molybdate, a zinc salt of substituted benzoic acid and zinc phosphate, in the ratio's stated, improves the corrosion inhibition of the coating substantially when compared to the use of either one of these zinc salts alone. Thus, by decreasing the pigment volume concentration (PVC) of the pigment system in the binder, a high gloss coating can be obtained without impairing the corrosion resistance. The combination of all three of the zinc salts synergistically provide a method of preparing a high gloss coating with substantially improved corrosion resistance. In the Examples, the polyester polyol was used as a solution in toluene and the HDI was used as a solution e.g. 75% in a solvent comprising toluene and an acetate. More specifically, the preferred polyester polyols of this invention have equivalent weights ranging from about 325 to 970, a hydroxyl number ranging from 41 to 252 and an acid number greater than 10.

The polyols, however, may include a variety of polyester polyhydroxyl compounds known in the art including for example the condensation-reaction products of pentaerythritol, a glycol, a monocarboxylic acid, and an aromatic or an aliphatic dicarboxylic acid. Any branched-chain glycols are usable in the formation of the polyester, although it is preferred that these glycols contain no more than 8 carbon atoms. Neopentyl glycol and pinacol are examples of branched-chain glycols. A particularly useful polyol is formed where the molar ratio of glycol to pentaerythritol is from 2:1 to about 6:1.

The monocarboxylic acid component of the polyester polyol prevents molecular weight build-up of the polyol. It has been found that any aromatic or aliphatic monocarboxylic acid, or mixtures of these, having 18 or less carbon atoms can be used. Normally, this acid will be used in a molar ratio of acid to pentaerythritol of about 1:1 to 2.5:1.

Examples of aromatic monocarboxylic acids are benzoic acid, butylbenzoic acid, triethyl benzoic acid, toluic acid, phenylacetic acid, and the like. Examples of aliphatic acids are acetic acid, propionic acid, butyric acid, valeric acid, caproic acid, caprylic acid, pelargonic acid, capric acid, lauric acid, myristic acid, palmitic acid, and stearic acid.

The dicarboxylic acids useful in the formation of the polyester polyol have the general formula

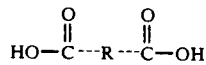

where R is aliphatic or aromatic group. Preferred are succinic acid, glutaric acid, adipic acid and pimelic acid. The most useful acids are those in which R has 2 to 8 carbon atoms with the preferred being maleic acid and itaconic acid. The aromatic dibasic acids that are preferred are phthalic, isophthalic, and terephthalic, although other aromatic dibasic acids can be used.

It is understood that the lower alkyl mono- or diesters of these acids and the anhydrides of these acids can also be used in place of the acids with equivalent results. If the above-mentioned esters are used, the alkyl groups preferably have no more than 5 carbon atoms. Other polyester polyols can be obtained by the condensation reaction between a polybasic acid, such as adipic acid, phthalic anhydride, isophthalic acid, etc., and a diol or triol, such as ethylene glycol, diethylene glycol, propylene glycol, trimethylol propane, glycerine, etc. The polyether polyols can be prepared by adding propylene oxide, ethylene oxide, or the like, to a polyhydric alcohol, such as glycerine, propylene glycol, etc.

The isocyanates and particularly the HDI are used as an organic solution and include various multi-functional aliphatic isocyanates having an isocyanate content (NCO) ranging from about 10 to 20% by weight of the compound, and an equivalent weight ranging from about 200 to 300. Specific examples of the organic polyisocyanates that can be used in the present invention make up 10 to 30% and preferably 15 to 25% by weight of the film-forming blend. These include aliphatic, cycloaliphatic, alkaryl, aralkyl, heterocyclic, and aryl di- or triisocyanates. Typically useful polyisocyanates include for example, diphenylmethane-4,4'-diisocyanate, diphenylene-4,4'-diisocyanate toluene-2,4-diisocyanate, toluene-2,6-diisocyanate, 3,3'-dimethoxy-4,4'-diphenylene diisocyanate methylene-bis-(4-cyclohexyl isocyanate) tetramethylene diisocyanate, hexamethylene diisocyanate, decamethylene diisocyanate, ethylene diisocyanate, ethylidene diisocyanate, propylene-1,2-diisocyanate, cyclohexylene-1,2-diisocyanate, m-phenylene diisocyanate, p-phenylene diisocyanate, 1,5-naphthalene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, furfurylidene diisocyanate, bis-(2-isocyanatoethyl)fumarate, 1,3,5-benzene triisocyanate, para, para', para"-triphenylmethane triisocyanate, 3,3'-diisocyanatodipropyl ether, xylylene diisocyanate, B.B-diphenyl propane-4,4'-diisocyanate, and isophorone diisocyanate Preferred are hexamethylene diisocyanate and methylene-bis-(4-cyclohexyl isocyanate). The polyisocyanates include the biurets of the formula:

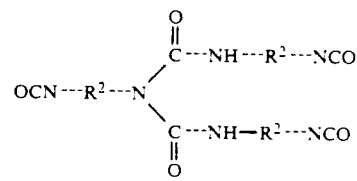

where $R^2$ is an aliphatic or aromatic hydrocarbon group having 1–12 carbon atoms.

By making the proper choice of polyols and by adjusting the NCO to OH ratio, the physical properties and efficiency of the film, such as the strength of film, flexibility, chemical resistance, solvent resistance, etc., can be modified over a wide range, making it suitable for a specific purpose. Compounds where the NCO to OH ratio ranges from 0.85 to 1.2 of NCO to 1.0 of OH groups e.g. 1:1 are suited for the manufacture of coating in accordance with this invention.

The blocking agents that may be used for the purpose of masking the free isocyanate radical of the isocyanate compounds include phenol, m-nitrophenol, p-chlorophenol, ethyl malonate, acetylacetone, ethyl acetoacetate, cresol, butyl mercaptan, methanol, ethanol, ethylene, chlorophydrin, etc. Although the temperature at which the above-mentioned blocking agents are dissociated varies with the agents, it is generally accepted that heating is required.

The coating compositions according to the present invention can be applied by any ordinary method of coating, such as spray, brush or roller coating, or dipping. The coating also permits the addition of commonly used pigments and plasticizer, or other kind of additives which may be used in small but effective amounts.

The hydroxyl numbers of the preferred polyester polyols should be at least 40 and more preferably between 41 and 252. The polyester, containing hydroxyl groups, is combined with the diisocyanate. This combination can be carried out in several ways known to the art. For example, to an organic solution of the polyester containing, if desired, a catalyst promoting urethane formation such as an organo-tin compound, an equivalent amount of the isocyanate is added. The combination is made at ambient temperature and the heat of reaction usually causes an increase in temperature. The mixture is agitated preferably at room temperature until the urethane reaction has been substantially completed. The course of the reaction can be followed by noting the viscosity of the mixture. When the viscosity becomes substantially constant, it may be concluded that the reaction has been substantially completed. The resultant reaction product contains insignificant amounts of free isocyanate and/or hydroxyl groups.

Alternatively, the polyester solution can be reacted with a small excess, e.g. about 10% excess of the equivalent amount, of the isocyanate component. After the urethane reaction has been substantially completed the excess NCO groups can be reacted with a "chain-extending" substance, e.g. water. This alternate procedure results in polymers of substantially equivalent character and moreover permits the reaction to proceed at a faster rate, due to the mass action of the excess NCO groups. Such small excess amounts are intended to be included within the meaning of the expression "stoichiometric amounts".

In a two package system, a solution of polyisocyanate is in one package, and a solution of the polyol is in a separate package. The two solutions are thoroughly mixed just before applying the coating composition. Separation of the two solutions is usually necessary since the "pot life" of the composition is short. The polyisocyanate (NCO) reacts with the hydroxyl groups of the polyol at room temperature and above. Regardless of the method by which the coating composition is prepared, the coating should contain 30 to 82% by weight of the polyurethane binder in up to about 85% e.g. 10-50% by weight of solvent. The solvent of the composition can be a mixture of the organic solvents wherein the reaction constituents of the binder react.

The coating composition of this invention may contain about 0.01-2.0% by weight, based on the weight of the polymer forming blend, of a curing catalyst. The catalysts are usually organo metallics such as dibutyl tin dilaurate and zinc octoate, dibutyl tin di-2-ethylhexoate, stannous octoate, stannous oleate, zinc naphthenate, vanadium acetyl acetonate, and zirconium acetyl acetonate. Also useful as catalysts are tertiary amines, such as, for example, triethylene diamine, heptamethylisobiguanide, triethylamine, pyridine, dimethylaniline, and methyl morpholine. When a two-component system is used, the catalyst can be added to either the polyisocyanate solution or the solution of the polyester polyol.

Instead of the two-component, "two-package" system a "one package" coating composition can be prepared if the reactive groups of the polyisocyanate are blocked with a blocking agent such a methyl ethyl ketoxime. This eliminates the need for keeping the hydroxyl-containing copolymer and polyester polyol apart from the polyisocyanate until just before use. When the coating composition, with the blocked polyisocyanate, is applied and heated the blocking agent is released, permitting the polyisocyanate to react with the polyester polyol.

The coating composition can optionally contain an ultraviolet light stabilizer, an antioxidant, or both. The ultraviolet light stabilizer can be present in an amount of 1-10% by weight, based on the weight of the binder; the antioxidant can be present in an amount of 0.1-3% by weight, based on the weight of the binder. Typical ultraviolet light stabilizers are benzophenones, triazoles, triazines, benzoates, lower alkyl thiomethylene-containing phenols, substituted benzenes, organophosphorous sulfides, and substituted methylene malonitriles. Particularly useful are the hindered amines and nickel compounds disclosed in U.S. Pat. No. 4,061,616.

The coating composition of this invention can be applied to a variety of substrates by any of the conventional application methods such a spraying, dipping, brushing, or flow coating. Substrates that can be coated with the composition are, for example, metal, wood, glass, or plastics such as polypropylene, polystyrene, copolymers of styrene, and the like. The coating is particularly suited for application over pretreated or unprimed metal.

The coating can be cured at room or ambient temperatures or can be dried by heating at 40°-120° C. for up to an hour. If the coating contains a blocked polyisocyanate, temperatures ranging up to about 150° C. may be necessary.

The hydrocarbon solvents may include a mixture of solvents e.g. benzene, toluene, xylene, and aromatic naphtha. Ester solvents such as ethyl acetate, butyl acetate, cellosolve, hexyl acetate, amyl acetate, ethyl proprionate, and butyl proprionate. Ketone solvents such as acetone, methyl ethyl ketone, methyl isopropyl ketone, methyl isobutyl ketone, diethyl ketone, and cyclohexanone. Glycol ester solvents such as ethylene. glycol monoethyl ether acetate, and diethylene glycol monoethyl ether acetate.

The particular zinc phosphate used in preparing the coating composition had an average particle size of about 5.0 microns and was particularly characterized as a zinc-barium phosphate. The zinc salt of benzoic acid was specifically characterized as having at least one hydroxyl group and nitro ($NO_2$) substituent and a molecular weight of about 100-500 e.g. 300, a density of about 2-3 grams per mililiter and a particle specific surface area of $16M^2$/gram. The benzoic acid salt was a commercial product obtained from BASF and identified as Sicorin-RZ. The zinc molybdate had a particle size average of about 4.0 microns and is commercially available as Moly-White 101. The titanium dioxide is preferably spherical with a particle size of about 0.25 microns.

In testing the coatings prepared in accordance with this invention, the corrosion protection for an aluminum substrate was found to be over 2000 hours in a 5% salt spray in accordance with ASTM Test Method B-117. The coating was also found to have outstanding performance when exposed to extreme heat conditions, high intensity of light and water, extreme cold conditions, hot lubricating oils and other chemicals normally found in aircraft operations. By utilizing the coating composition of this invention a high gloss corrosion resistant film can be obtained on various substrates as a single top coat. The coating therefore has properties which function as a primer and more important as a single top coat which is highly adherent, flexible, chemical resistant and resistant to all weather conditions. The coatings of this invention lower the risk of failure due to cracking especially at low temperatures and are easily touchedup since only one coating need be applied. Since a coating provided by this invention requires only one coat, it requires also less time for application and removal and certainly saves on manpower that would generally be needed in the preparation of a high gloss two coat system. Moreover, the present coating provides protection at lower film thicknesses thereby reducing the weight of the coating compared to a two coat paint system which is an important factor when considering aircraft coatings.

It is obvious that there are other variations and modifications which can be made with respect to this invention without departing from the spirit and scope of the invention as particularly set forth in the appendant claims.

The invention claimed is:

1. A high gloss corrosion-resistant coating which comprises from about
   30 to 82 percent by weight of a polyurethane binder and from about
   18 to 70 percent by weight of a pigment system consisting essentially of approximately
      13 to 34 parts by weight of a zinc phosphate,
      1 to 5 parts by weight of a zinc salt of a benzoic acid,
      63 to 85 parts by weight of zinc molybdate,
   0 to 85 percent by weight of the total pigment system of titanium dioxide and
   0 to 85 percent by weight of the coating of at least one organic solvent.

2. The coating of claim 1 wherein the solvent comprises from about 10–40 percent by weight of the coating.

3. The coating of claim 2 wherein the solvent comprises a mixture of solvents.

4. The coating of claim 1 wherein up to 85 percent by weight of the pigment system is spherical $TiO_2$.

5. The coating of claim 1 wherein the zinc salt is a salt of a substituted benzoic acid having one hydroxyl group and one nitro group.

6. The coating of claim 1 wherein the polyurethane is derived from an isocyanate and an aliphatic polyester polyol wherein the NCO to OH group ratios range from 0.85–1.2 to 1.0.

7. The coating of claim 6 wherein the polyurethane is derived from an aliphatic polyester polyol and hexamethylene diisocyanate.

8. A high-gloss corrosion-resistant coating which comprises 30 to 82% by weight of a polyurethane binder derived from approximately 15 to 25 percent by weight of an aliphatic polyester polyol and 10 to 16 percent by weight of a diisocyanate in an organic solvent, and from about 18 to 70 percent by weight of a pigment system consisting essentially of about 2 to 14 parts by weight of a zinc-barium phosphate, 0.2 to 1.5 parts by weight of a zinc salt of a substituted benzoic acid, and 4 to 27 parts by weight of zinc molybdate, and 0 to 85 percent by weight of titanium dioxide based on the total weight of the pigment system.

9. The coating of the claim 8 wherein the OH to NCO ratio of the aliphatic polyester polyol and the hexamethylene diisocyanate is about 1 to 1.

10. The coating of claim 9 wherein the zinc salt of the benzoic acid has one hydroxyl and nitro ($NO_2$) substituent.

11. The coating of claim 1 wherein the aliphatic polyester polyol and the hexamethylene diisocyanate have a NCO to OH ratio of about 1 to 1.

12. A high-gloss corrosion resistant coating which comprises from about (a) 30 to 82 percent by weight of a polyurethane binder derived from about 15 to 25 percent by weight of an aliphatic polyester polyol in at least one organic solvent having an equivalent weight ranging from about 325 to 970, and a hydroxyl number ranging from about 41 to 252, and from about 10 to 16 percent by weight of hexemethylene diisocyanate in at least one organic solvent having an equivalent weight ranging from about 200 to 300 and an isocyanate content ranging from about 10 to 20 percent by weight, and from about (b) 18 to 70 percent by weight of a pigment system consisting essentially of from about 0.2 to 1.5 parts by weight of a zinc salt of a benzoic acid having hydroxyl and nitro substituents with a molecular weight ranging from about 100 to 500, about 2 to 14 parts by weight of a zinc phosphate, and about 4 to 27 parts by weight of zinc molybdate, and from 0 to 85 percent by weight of titanium dioxide based on the total weight of the pigment system.

13. The coating of claim 12 wherein the zinc phosphate is a zinc-barium phosphate.

14. A process of preparing a corrosion-resistant urethane coating on a substrate which comprises forming the polyurethane coating by applying onto the substrate an organic solution comprising from about (a) 10 to 30 percent by weight of a polyol polyester and 5 to 20 percent by weight of a diisocyanate, and (b) 18 to 70 percent by weight of a pigment system consisting essentially of about 13 to 34 parts by weight of a zinc phosphate, 1 to 5 parts by weight of a salt of a substituted benzoic acid, 63 to 85 parts by weight of zinc molybdate, and 0 to 85 percent by weight of titanium dioxide based on the total weight of the pigment system.

15. The process of claim 13 wherein the ratio of the NCO groups of the isocyanate to the OH groups of the polyol range from about 0.85–1.2 to 1.0.

* * * * *